United States Patent
Kobayashi

(10) Patent No.: US 6,826,974 B2
(45) Date of Patent: Dec. 7, 2004

(54) AUTOMATIC TRANSMISSION

(75) Inventor: Toshio Kobayashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 5 days.

(21) Appl. No.: 10/120,405

(22) Filed: Apr. 12, 2002

(65) Prior Publication Data
US 2002/0148311 A1 Oct. 17, 2002

(30) Foreign Application Priority Data
Apr. 16, 2001 (JP) .................................. P.2001-117430

(51) Int. Cl.$^7$ ................................................ F16H 3/38
(52) U.S. Cl. .................. 74/339; 74/340; 192/48.8; 192/48.9; 192/48.91
(58) Field of Search ................. 74/339, 340; 192/48.8, 192/48.9, 48.91

(56) References Cited

U.S. PATENT DOCUMENTS

| | | | | |
|---|---|---|---|---|
| 1,541,240 A | * | 6/1925 | Barkeij | 192/3.63 |
| 3,508,450 A | * | 4/1970 | Richards | 74/340 |
| 4,463,621 A | * | 8/1984 | Fisher | 74/330 |
| 4,464,947 A | * | 8/1984 | Windsor-Smith et al. | 74/329 |
| 4,481,836 A | * | 11/1984 | Richards | 74/331 |
| 4,616,521 A | | 10/1986 | Akashi et al. | |
| 4,860,607 A | | 8/1989 | Numazawa et al. | |
| 5,617,936 A | * | 4/1997 | Nemoto | 192/219 |
| 5,890,392 A | * | 4/1999 | Ludanek et al. | 74/331 |
| 6,009,768 A | | 1/2000 | Hoshiya et al. | |
| 6,401,894 B1 | * | 6/2002 | Merkel et al. | 192/48.9 |
| 6,464,059 B1 | * | 10/2002 | Kundermann et al. | 192/87.11 |
| 6,544,142 B2 | * | 4/2003 | Kobayashi | 477/54 |
| 6,546,826 B2 | * | 4/2003 | Suzuki | 74/335 |
| 6,550,352 B2 | * | 4/2003 | Okada et al. | 74/335 |
| 6,551,213 B2 | * | 4/2003 | Suzuki | 477/111 |
| 2002/0088291 A1 | * | 7/2002 | Bowen | 74/339 |
| 2002/0148310 A1 | * | 10/2002 | Uchino | 74/335 |

FOREIGN PATENT DOCUMENTS

| | | | |
|---|---|---|---|
| EP | 0 300 792 A | 1/1989 | |
| JP | 58-149443 | 9/1983 | |
| JP | 60069330 A | * 4/1985 | ........... F16D/23/10 |
| JP | 03-048059 | 3/1991 | |
| JP | 4-262166 | 9/1992 | |
| JP | 07-167278 | 7/1995 | |
| JP | 11-170877 | 6/1999 | |
| JP | 2000-65199 | 3/2000 | |

* cited by examiner

Primary Examiner—Rodney H. Bonck
Assistant Examiner—David D. Le
(74) Attorney, Agent, or Firm—McGinn & Gibb, PLLC

(57) ABSTRACT

An automatic transmission having gear trains provided between an input shaft and an output shaft, the gear trains including drive gears mounted on the input shaft and driven gears mounted on the output shaft, includes a start clutch provided between a crankshaft of an engine and the input shaft for transmitting or shutting off an engine power from a crankshaft of the engine to the input shaft, a changeover mechanism for selecting a desired gear train through which power is transmitted from a plurality of gear trains, two bypass clutches, one is provided between third gear transmission gear trains and another is provided between sixth gear transmission gear trains for transmitting a different torque from the input shaft to the output shaft respectively, on gearshiftings and a bypass clutch control means for selecting at least one desired bypass clutch through which power is transmitted.

24 Claims, 8 Drawing Sheets

11:INPUT SHAFT
12:OUTPUT SHAFT
13:START CLUTCH
16:ENGINE
17:CRANKSHAFT
21~27:DRIVE GEARS
31~37:DRIVEN GEARS
41:CHANGEOVER MECHANISM
42:CHANGEOVER MECHANISM
51:FIRST BYPASS CLUTCH
52:SECOND BYPASS CLUTCH

AUTOMATIC TRANSMISSION

BACKGROUND OF THE INVENTION

The present invention relates to an automatic transmission for an automobile and more particularly to an automatic transmission having a plurality of transmission gear trains between input and output shafts.

Generally, a manual transmission, in which the gear is manually shifted, has an input shaft directly connected to an engine and including a plurality of drive gears and has an output shaft including a plurality of driven gears paired with the corresponding drive gears and connected to drive wheels. That is, there are provided a plurality of transmission gear trains between the input shaft and the output shaft. In this manual transmission, when the gear is changed, after a clutch is disengaged, changeover mechanisms such as synchromesh mechanism are manually operated to change over paired transmission gear trains (hereinafter, referred to as just gear trains) and then the clutch is engaged. This sequence of manual operations accomplishes a gearshifting of a vehicle.

The manual transmission can be converted into an automatic transmission by performing gearshiftings and clutch operations by means of a shift actuator hydraulically operated. This type of transmission having a plurality of transmission gear trains is called an Automated Manual Transmission (hereinafter referred to as "AMT"). The transmission has advantages of having a small number of components and an excellent transmission efficiency of power, compared to a conventional torque converter type automatic transmission primarily constituted by planetary gears and the like.

For example, Japanese Patent Application Laid-open No. Toku-Kai 2000-65199 discloses this AMT type automatic transmission having a start clutch for changing over the connection of a crank shaft and an input shaft between an engagement condition and a disengagement condition and a changing clutch (hydraulically operated multiple disc clutch) for transmitting torque from the input shaft to an output shaft to prevent a so-called "torque drop".

According to this disclosure, gear trains of the first gear through the fifth gear are provided between the input and output shafts. Gear trains of third and fourth gear are engaged by a first synchromesh mechanism, respectively and gear trains of first and second gear are engaged by a second synchromesh mechanism, respectively. A gear train of fifth gear is engaged by the engagement of a by-pass clutch. That is, power is transmitted by engaging the by-pass clutch to prevent a torque drop between the input shaft and the output shaft. In this case, since the by-pass clutch is provided in the gear train of fifth gear, the torque capacity transmitted from the input shaft to the output shaft corresponds to that of the fifth gear.

Accordingly, when the gear is changed from the first gear to the second gear, the torque transmitted through the bypass clutch is a transmission torque at the fifth gear ratio. As a result, the transmission torque drops from the torque of the second gear to that of the fifth, even if an inertia force of the bypass clutch increases the transmission torque in some degree. This torque drop, or shift shock has a great effect on "shift quality" of the transmission. On the other hand, in order to reduce the magnitude of shift shock, when the shift time is elongated, a driver feels uncomfortable. Similarly, when the gear is changed from the second gear to the third gear, the driver still feels a shift shock.

Some vehicle has an automatic transmission being equipped with an extra high gear position, for example, a sixth gear position or an extra low gear position for the purpose of improving fuel economy, enhancing quietness in a high speed traveling or increasing driving force of a four wheel drive vehicle. In this case, the shift quality of the transmission may further be exacerbated by an increased difference of gear ratio between the lowest and highest gear positions. In particular, in case where such transmission is installed on an industrial vehicle or a heavy duty vehicle, the discrepancy of gear ratios increases and shift shock further becomes worse.

Japanese Patent Application Laid-open No. Toku-Kai-Hei 4-262166 discloses an automatic transmission in which two load connecting clutches are provided between the input and output shafts. One load connecting clutch transmits power to the gear train at even number gear positions, second and fourth gear and the other load connecting clutch transmits power to the gear train at odd number gear positions, first, third and fifth gear ratios. When the gear is shifted, a changeover is performed between two load connecting clutches. For example, when the gear is up-shifted from the first gear to the second gear, since the load connecting clutch on the even number gear position side is disengaged, a synchronizer sleeve is operated beforehand to engage the synchronizer for the second gear ratio with the output shaft. Next the load connecting clutch on the odd number gear position side is disengaged and the load connecting clutch on the even number gear position side is engaged. Thus, the gear shifting form the first to second gears is accomplished.

However, since this automatic transmission is designed so as to shift gears by changing over the load connecting clutch between the odd number gear position side and the even number gear position side, in case where the gear is up-shifted from the first gear ratio to the fifth gear ratio, it is necessary to step in midway gear positions, second, third and fourth positions in sequence. Therefore, for example, such jumping shifts as shifts from first gear to third gear or second gear to fourth gear, are impossible. Since the gear must be changed while midway gear positions are experienced, it takes a long time to shift gears. Especially, in case of passing, when a gearshifting must be finished in short time, the gearshifting taking time gives a psychological burden on a driver. Such inconvenience is remarkable particularly when the vehicle travels on winding roads with up-and-downs.

SUMMARY OF THE INVENTION

It is an object of the present invention to provide an automatic transmission having small shift shocks and a good shift quality. It is a further object of the present invention to realize a compact automatic transmission having an excellent installability. Further, it is another object of the present invention to provide an automatic transmission capable of making a jumping shift arbitrarily. Furthermore, it is still another object of the present invention to provide an automatic transmission having a good shift responsibility.

In order to achieve these objects, an automatic transmission having a plurality of gear trains provided between an input shaft and an output shaft for transmitting torque from the input shaft to the output shaft, the gear trains including drive gears mounted on the input shaft and driven gears mounted on the output shaft, comprises a start clutch provided between a crankshaft of an engine and the input shaft for transmitting or shutting off engine power from a crankshaft of the engine to the input shaft, a changeover mechanism for selecting a desired gear train through which power is transmitted from a plurality of gear trains, a plurality of bypass clutches provided between specified gear trains for transmitting a different torque from the input shaft to the output shaft respectively, and a bypass clutch control means for selecting at least one desired bypass clutch through which power is transmitted when the gear is shifted from a plurality of the bypass clutches.

DETAILED DESCRIPTION OF THE PREFERRED EMBODIMENTS

Figure 1:
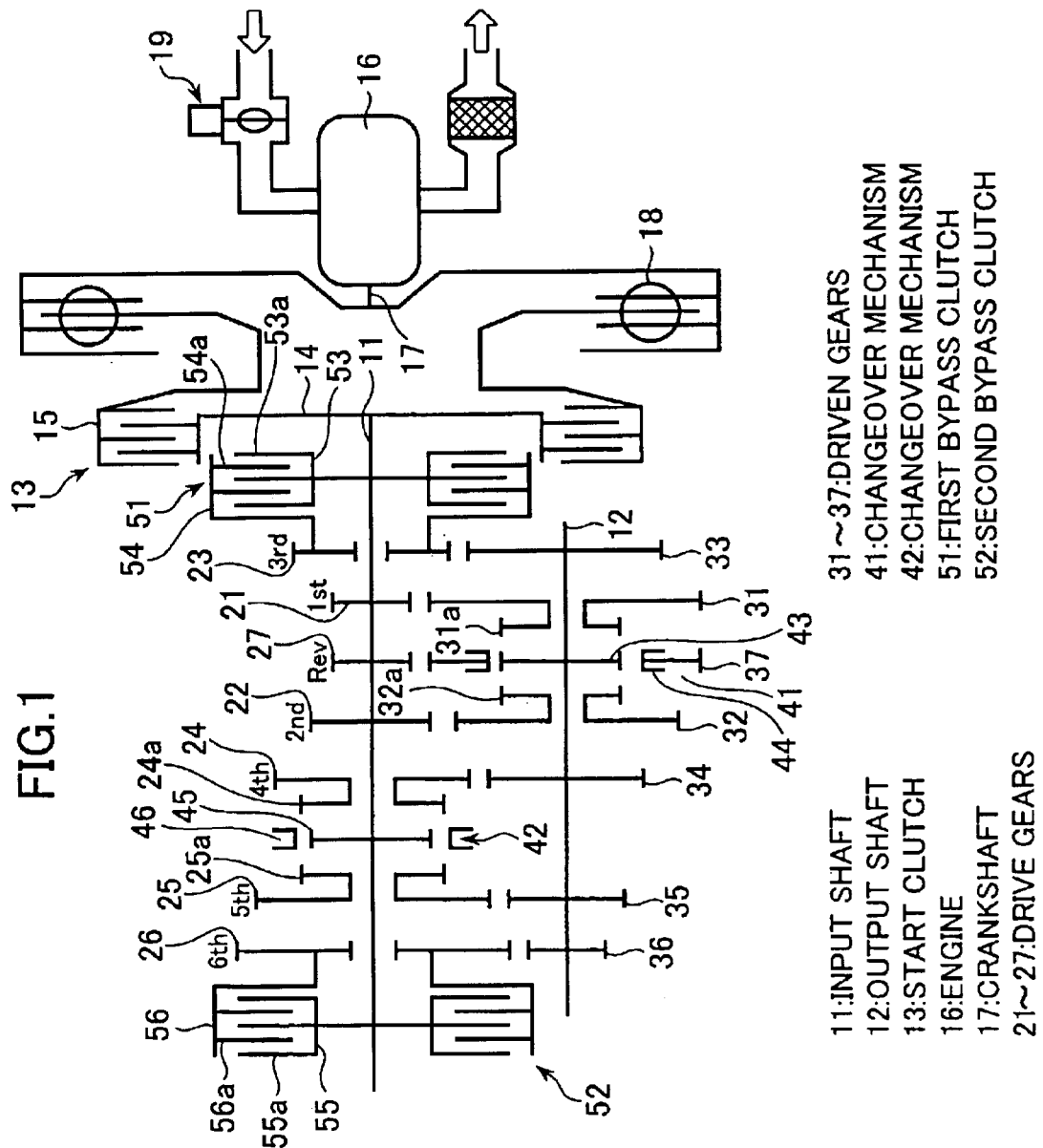
FIG. 1 is a skeleton diagram showing an automatic transmission according to a first embodiment of the present invention.

Referring now to FIG. 1, the automatic transmission has an input shaft 11 and an output shaft 12 in a parallel relationship with each other. The input shaft is provided with an input clutch or start clutch 13. The start clutch 13 has a clutch hub 14 secured to the input shaft 11 and a clutch drum 15 around the clutch hub 14 and a plurality of clutch discs are disposed between the clutch hub 14 and the clutch drum 15, constituting a multiple-disc clutch.

The clutch drum 15 of the start clutch 13 is connected with a crankshaft 17 of an engine 16 through a damper 18 constituted by a plurality of coil springs arranged in a circumference direction. Power of the engine 16 is transmitted tot he input shaft 11 through the damper 18 and the start clutch 13. The engine 16 includes an electronic control throttle valve 19 for regulating torque and speed of the engine. In a normal operation, the electronic control throttle valve 19 opens and closes based on signals outputted from an electronic control unit (not shown) according to the depression amount of an accelerator pedal (not shown). Further, when necessary, the electronic control throttle valve 19 opens and closes based on look-up tables predetermined according to detected operating conditions.

A drive gear 21 for the first gear and drive gear 22 for the second gear are secured to the input shaft 11, respectively. On the other hand, drive gears 23, 24, 25 and 26 for the third gear, fourth gear, fifth gear and sixth gear, respectively, are rotatably mounted on the input shaft 11. Also, driven gears 31 and 32 for the first gear and the second gear, respectively, are rotatably mounted on the output shaft 12. On the other hand, driven gears 33, 34, 35 and 36 for the third gear, fourth gear, fifth gear and sixth gear, respectively, are secured to the output shaft 12. While respective drive gears mesh with corresponding driven gears, forward speed transmission gear trains are formed. When a given gear train is selected to transmit power therethrough, the automatic transmission is established to a shift position corresponding to the selected gear train.

The output shaft 12 has a first changeover mechanism 41 for selectively changing over the gear between first and second gears and the input shaft 11 has a second changeover mechanism 42 for selectively changing over the gear between fourth and fifth gears. The first changeover mechanism 41 may be provided on the input shaft 11 and the second changeover mechanism 42 may be provided on the output shaft 12.

The first changeover mechanism 41 includes a synchronizer hub 43 disposed between the driven gears 31 for the first gear and the driven gear 32 for the second gear and secured to the output shaft 12 and a synchronizer sleeve 44 constantly meshing with the synchronizer hub 43. When the synchronizer sleeve 44 meshes with a spline 31a. integrally formed with the driven gear 31, the gear is established to the first gear and when the synchronizer sleeve 44 meshes with a spline 32a integrally formed with the driven gear 32, the gear is established to the second gear.

The second changeover mechanism 42 includes a synchronizer hub 45 disposed between the drive gears 24 for the fourth gear and the drive gear 25 for the fifth gear and secured to the input shaft 11 and a synchronizer sleeve 46 constantly meshing with the synchronizer hub 45. When the synchronizer sleeve 46 meshes with a spline 24a integrally formed with the drive gear 24, the gear is established to the fourth gear and when the synchronizer sleeve 46 meshes with a spline 25a integrally formed with the drive gear 25, the gear is established to the fifth gear.

A reverse drive gear 27 is secured to the input shaft 11 and a reverse driven gear 37 is secured to the synchronizer sleeve 44. The reverse drive gear 27 meshes with the reverse driven gear 37 via an idler gear mounted on an idler shaft (not shown).

The idler shaft has a third changeover mechanism (not shown) which is selectively operated to obtain a reverse gear position. These first, second and third changeover mechanisms include synchromesh mechanisms, respectively.

The automatic transmission of this embodiment has six forward speed ratios constituting two groups of transmission gear train, a low speed ratio group including first gear, second gear, third gear and reverse gear and a high speed ratio group including fourth gear, fifth gear and sixth gear.

A first bypass clutch 51 is mounted on the input shaft 11 to transmit torque of the input shaft 11 to the output shaft 12 through the drive gear 23 for the third gear. Further, a second bypass clutch 52 is mounted on the input shaft 11 to transmit torque of the input shaft 11 to the output shaft 12 through the drive gear 26 for the sixth gear. Consequently, the first bypass clutch 51 transmits torque from the input shaft 11 to the output shaft 12 with a highest gear ratio of the low speed ratio group and the second bypass clutch 52 transmits torque from the input shaft 11 to the output shaft 12 with a highest gear ratio of the high speed ratio group. Thus, the bypass clutch 51 constituting the gear train for third gear is engaged when the third gear is selected. Similarly, the bypass clutch 52 constituting the transmission gear train for sixth gear is engaged when the sixth gear is selected. Since the respective bypass clutches 51, 52 have gear trains with different gear ratios, torque transmitted from the input shaft 11 to the output shaft 12 differs, respectively.

In this embodiment, the speed ratio is divided into two groups, however it may be divided into three or more groups having at least one bypass clutch, respectively.

The first bypass clutch 51 has a clutch hub 53 secured to the input shaft 11 and a clutch drum 54 secured to the drive gear 23 of third gear and a plurality of clutch discs 53a, 54a are interposed between these. When the bypass clutch 51 is engaged, the input shaft 11 is connected with the drive gear 23 and when disengaged, the input shaft 11 is disconnected from the drive gear 23. The second bypass clutch 52 has a clutch hub 55 secured to the input shaft 11 and a clutch drum 56 secured to the drive gear 26 of sixth gear and a plurality of clutch discs 55a, 56a are interposed between these. When the bypass clutch 52 is engaged, the input shaft 11 is connected with the drive gear 26 and when disengaged, the input shaft 11 is disconnected from the drive gear 26.

Figure 2:
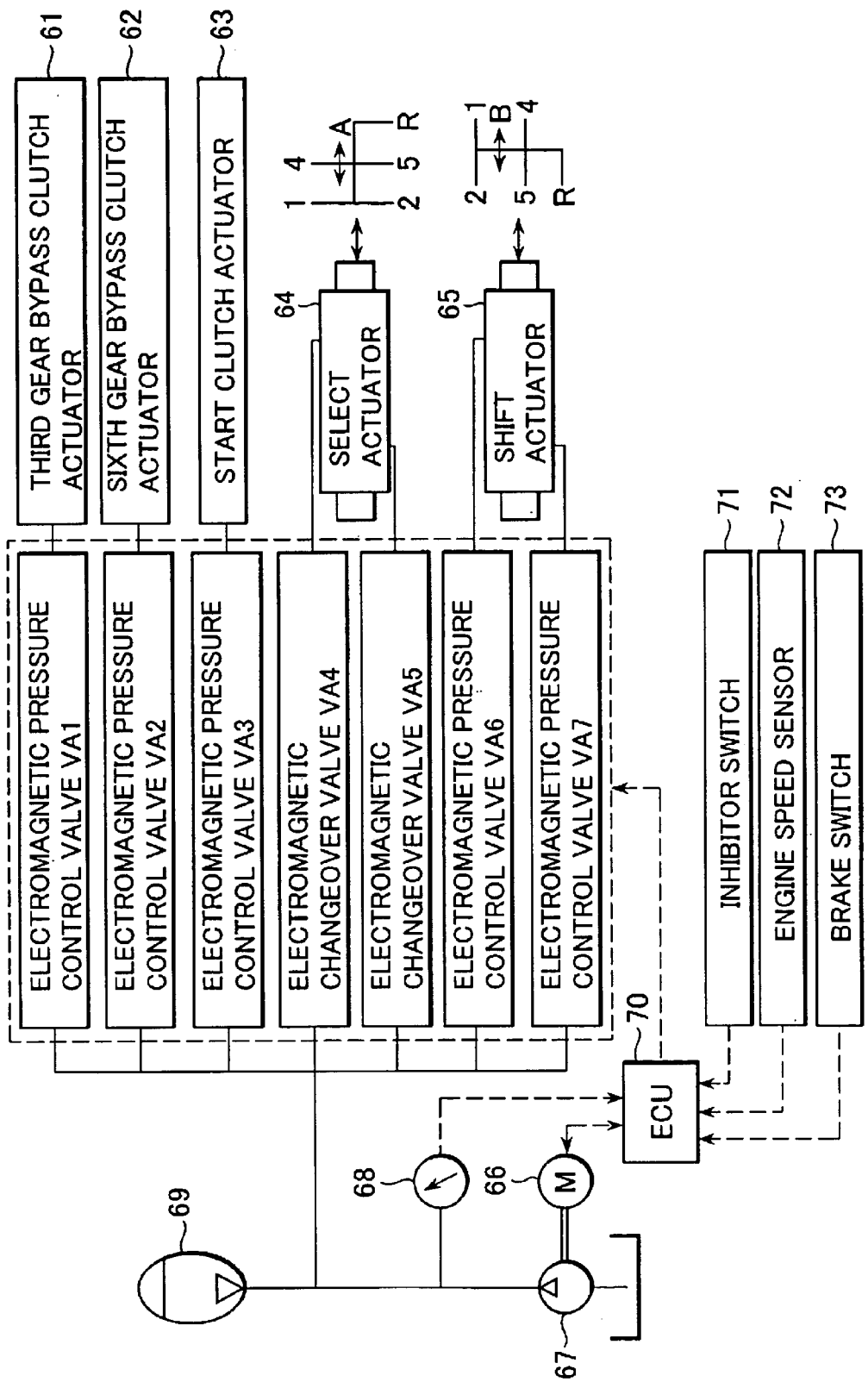
FIG. 2 is a block diagram showing a hydraulic control circuit to control the operation of an automatic transmission.

Referring to FIG. 2, the automatic transmission includes a third gear bypass clutch actuator 61 for actuating the first bypass clutch 51, a sixth gear bypass clutch actuator 62 for actuating the second bypass clutch 52 and a start clutch actuator 63 for actuating the start clutch 13. Further, the automatic transmission includes a select actuator 64 and a shift actuator 65 for obtaining a required speed ratio by selecting a transmission gear train from a plurality of transmission gear trains. The gear is changed to forward speed ratios, first, second, fourth, and fifth gears and a reverse speed ratio by operating these two actuators 64 and 65.

An oil pump 67 driven by an electric motor 66 feeds working oil to operate these actuators. That is, working oil is fed to the third gear bypass clutch actuator 61 through an electromagnetic pressure control valve VA1, to the sixth gear bypass clutch actuator 62 through an electromagnetic pressure control valve VA2 and to the start clutch actuator 63 through an electromagnetic pressure control valve VA3, from the oil pump 67. Further, working oil is fed to the select actuator 64 through electromagnetic pressure control valves VA4 and VA4 and to the shift actuator 65 through electromagnetic pressure control valves VA6, VA7. The select actuator 64 actuates a select lever in a direction marked with an arrow A of FIG. 2 and the shift actuator 65 actuates the select lever in an direction marked with an arrow B of FIG. 2.

The sophisticated electromagnetic pressure control valves VA6, VA7 are used to actuate the shift actuator 65. On the other hand, the reason why the select actuator 64 can be controlled by the electromagnetic changeover valves VA4, VA5 having simple structure, is that the select actuator 64 has a two-position changeover operation (select operation) simply traveling in a direction marked with an arrow "A" until abutting against dead stops. However, since the shift actuator 65 has a three-position changeover operation (shift operation) traveling in a direction marked with an arrow "B" and needing synchronism by a synchronizer, that is, needing a control of operational force to prevent abrasion of synchronizer rings due to excessive operational forces, it is necessary to use the electromagnetic pressure control valves VA6, VA7 for controlling the shift actuator 65. Another reason for using the electromagnetic pressure control valves is a reduction of noise that is caused when the shift actuator 65 operates. Since the shift operation in the "B" direction requires a larger force than the select operation in the "A" direction, when the shift actuator 65 abuts against the dead stops, large noises are apt to be produced. The operational stage of the shift actuator 65 is divided into three stages. The operational force is controlled to be strong at an initial stage, controlled to be moderate at the synchronism of the synchronizer and controlled to be weak at a final stage. Therefore, the shift actuator 65 requires not only a control valve with ON-OFF operations of hydraulic pressure but also an electromagnetic pressure control valve capable of adjusting hydraulic pressure supplied.

The electric motor 66 and respective valves VA1 to VA7 are controlled by signals from a control unit ECU 70 and the discharge pressure (line pressure) fed from the oil pump 67 is monitored by a pressure sensor 68. The working oil fed from the oil pump 67 is partially accumulated in an accumulator 69. The accumulator 69 has a sealed chamber filled with nitrogen gas and the like. When the working oil is poured into the accumulator 69, nitrogen gas is compressed and pressure energy of the working oil is converted into pressure energy of gas. The line pressure is accumulated in the accumulator and, as a result, the line pressure is stabilized. Further, when the oil pump or a hydraulic system fails, a minimum emergency operation such as down-shifting to third gear or less can be secured. The oil pump 67 may be driven by the engine without being driven by the electric motor 66.

The control unit 70 inputs signals from an inhibitor switch 71, an engine speed sensor 72, a brake switch 73 and the like. The control unit 70 detects a position of a selector lever based on signals from the inhibitor switch 71 and detects engine speeds by the engine speed sensor 72. Further, the control unit 70 detects a present vehicle speed and an opening angle of accelerator pedal by means of miscellaneous sensors (not shown). The control unit 70 detects vehicle operating conditions based on these detected data and outputs a drive signal to the electric motor 66 as desired and control signals are sent to respective valves VA1 to VA7. Thus, the control unit ECU 70 functions as a bypass clutch control means. Further, the control unit ECU 70 monitors the line pressure fed from the oil pump 67 at all times. In case where the hydraulic pressure becomes higher than a specified value, the electric motor 66 is stopped. After that, when the line pressure becomes lower than a specified value as a result of repeated shift operations, the electric motor starts to drive again.

Next, the operation of the bypass clutches 51, 52 will be described. First, the operation at up-shifts will be described. The first bypass clutch 51 operates when those gears of the low speed ratio gear train group are shifted such as first gear to second gear and second gear to third gear. For example, when the gear is up-shifted from first gear to second gear, traveling conditions of the vehicle are detected from information such as accelerator pedal opening angles, vehicle speeds, engine speeds and gear positions and then the first bypass clutch 51 is engaged for a specified period of time based on a predetermined program. As a result, since torque is transmitted from the input shaft 11 to the output shaft 12 through the bypass clutch 51, so-called "torque drop" generating when the changeover mechanism 41 changes over at gear shifting is reduced and a shift shock is alleviated. Further, when the gear is up-shifted from second gear to third gear, the electronic control throttle valve 19 is closed so as to reduce engine torque while being synchronized with the control of the bypass clutch 51. Thus, the shift shock can be alleviated by controlling both the bypass clutch 51 and electronic control throttle valve 19.

The second bypass clutch 52 operates when those gears of the high speed ratio gear train group are shifted such as third gear to fourth gear, fourth gear to fifth gear and fifth gear to sixth gear. For example, when the gear is up-shifted from third gear to fourth gear or from fourth gear to fifth gear, traveling conditions of the vehicle are detected and then the second bypass clutch 52 is engaged for a specified period of time based on a predetermined program. As a result, since torque is transmitted from the input shaft 11 to the output shaft 12 through the bypass clutch 52, the torque drop during gear shifts is reduced and a shift shock is alleviated. Further, when the gear is up-shifted from fifth gear to sixth gear, the electronic control throttle valve 19 is closed so as to reduce engine torque while the second bypass clutch 52 is controlled and as a result the shift shock can be alleviated.

Figure 3:
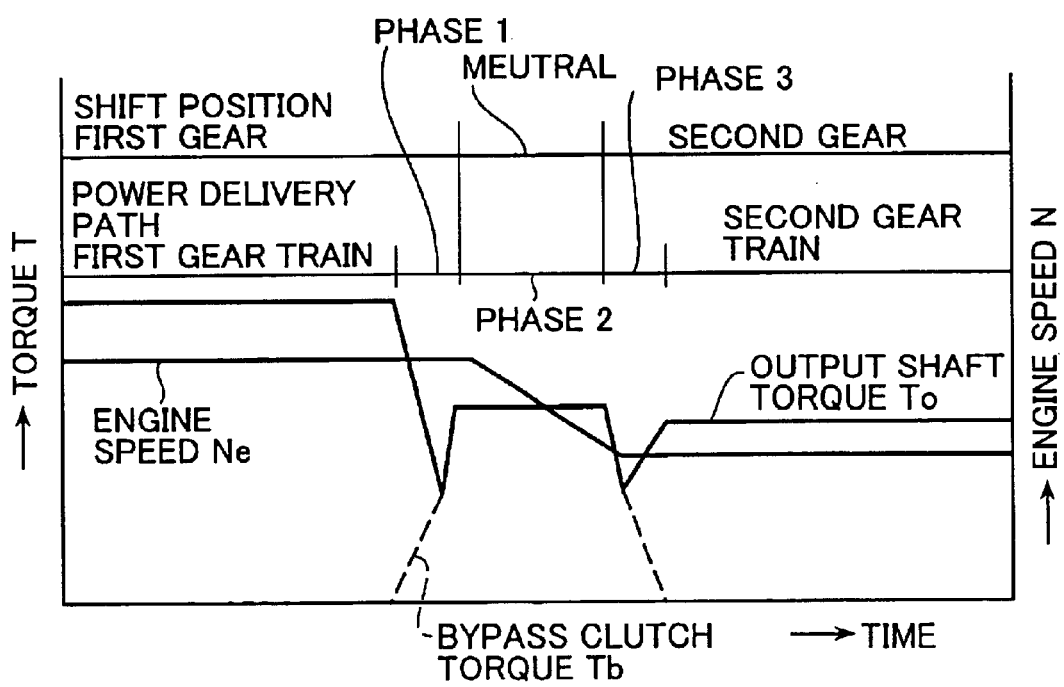
FIG. 3 is a time chart showing changes of engine speeds and torque of an output shaft when the gear is up-shifted from first gear to second gear.

FIG. 3 is a time chart showing changes of engine speed Ne and torque To of the output shaft 12 when the gear is up-shifted from first gear to second gear. In the drawing, SHIFT POSITION indicates a position where the synchronizer sleeve 44 is engaged. The synchronizer sleeve 44 travels from a position of first gear, that is, a position where the synchronizer sleeve 44 is engaged with the driven gear 31 of the first gear through the spline 31a to a position of second gear, that is, a position where the synchronizer sleeve 44 is engaged with the drive gear 32 of the second gear through the spline 32a via a neutral position. When the shift operation is carried out, first a hydraulic pressure is supplied to a hydraulic pressure chamber of the third gear bypass clutch actuator 61 to actuate the first bypass clutch 51. Thus, power is transmitted through two power delivery paths, the first gear transmission gear train and the third gear transmission gear train. This state is called a state of PHASE 1 in the drawing.

The driven gear 31 of the first gear and the driven gear 33 of the third gear are mounted on the same output shaft 12 but respective gear trains have a different gear ratio from each other. Since the drive gear 23 of the third gear rotates faster than the drive gear 21 of the first gear due to the difference of gear ratio between the first and second gears, when the bypass clutch 51 is engaged, a torque corresponding to the state of engagement is transmitted through the third gear transmission gear train.

Next, the synchronizer sleeve 44 enters into a neutral position, a state of PHASE 2, in which the synchronizer sleeve 44 is engaged only with the synchronizer hub 43. In this state, power is transmitted from the input shaft 11 to the output shaft 12 through the third gear transmission gear train constituted by the drive gear 23 and driven gear 33 and at the same time the electronic throttle valve 19 is closed so as to reduce the engine speed or the rotation speed of the input shaft 11.

When the engine speed is reduced to a speed equivalent to the second gear, the synchronizer sleeve 44 travels from a state of being engaged only with the synchronizer hub 43 to a state of being engaged with both the synchronizer hub 43 and the spline 32a. In this state, a state of PHASE 3, power is transmitted through two power delivery paths, one is the second gear transmission gear train and another is the third gear transmission gear train. Next, when hydraulic pressure fed to the third gear bypass clutch actuator 61 is drained, the bypass clutch 51 is released and power is transmitted from the input shaft 11 to the output shaft 12 only through the second gear transmission gear train.

Thus, at up-shifts, since the synchronizer sleeve 44 is engaged with the spline 32a when the engine speed is reduced to a speed equivalent to the second gear by simultaneously performing the bypass clutch control and the engine control, no gear clash occurs and a smooth shift operation is accomplished. When the synchronizer sleeve 44 is in a neutral position, since power is transmitted through the bypass clutch 51, occurrence of torque drops, particularly those which are a problem when the gear is up-shifted from first to second gear or from second to third gear, can be decreased. FIG. 3 indicates the manner of changes of engine speeds and torque when the gear is up-shifted from first to second gear, however that manner is similar when the gear is up-shifted from other gears.

Figure 4A:
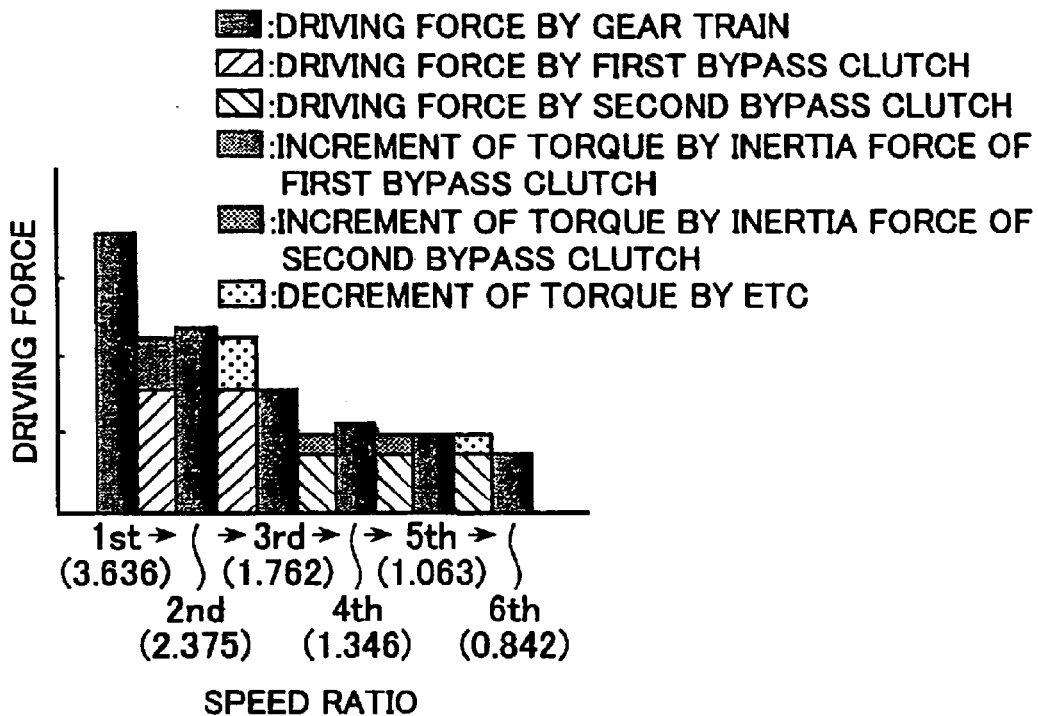
FIG. 4a is a diagram showing driving forces at up-shifts in each gear according to the present invention.

FIG. 4a is a graph showing a driving force transmitted from the input shaft 11 to the output shaft 12 at up-shifts of respective speed ratios according to the automatic transmission illustrated in FIG. 1. On the other hand, FIG. 4b is a graph for comparing with FIG. 4a and for showing a driving force transmitted from the input shaft 11 to the output shaft 12 at up-shifts of respective speed ratios according to an automatic transmission described in Toku-Kai 2000-651999 in which only fifth gear transmission gear train is engaged by a bypass clutch.

Figure 4B:
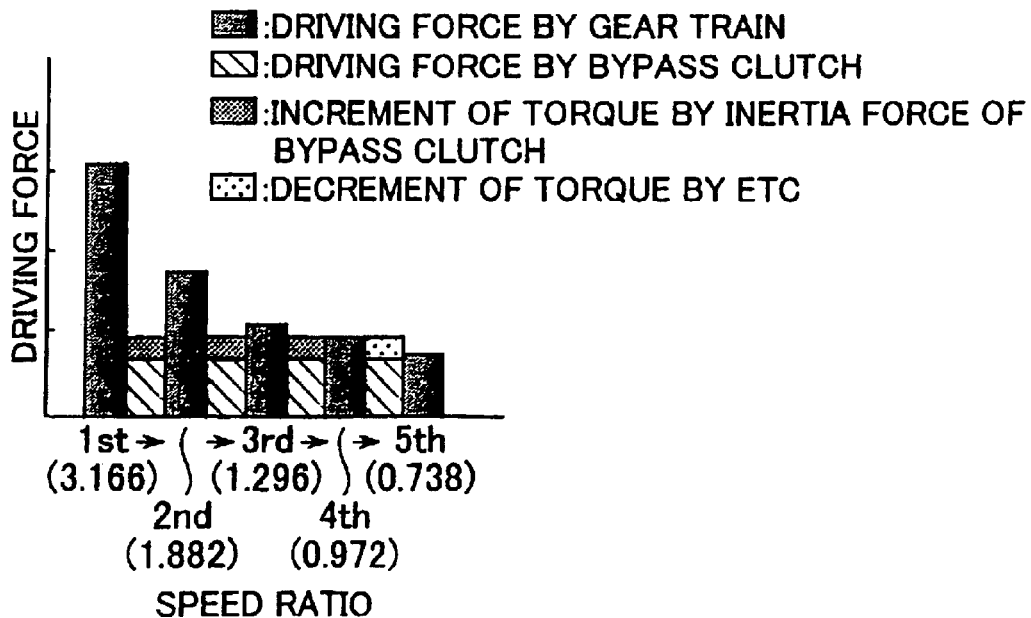
FIG. 4b is a diagram showing driving forces at up-shifts in each gear according to an example of prior art.

In the automatic transmission of FIG. 4b, the torque capacity to be transmitted from the input shaft to the output shaft through the bypass clutch is equivalent to that of fifth gear ratio. Hence, when the gear is changed from first to second gear, a torque transmitted via the bypass clutch plus a torque incremented by the inertia force on the input side of the bypass clutch makes a great difference from a torque transmitted via the second gear transmission gear train. On the other hand, in case of the automatic transmission according to the present invention, when an up-shift is performed in a low speed gear ratio group of the transmission gear trains, a torque capacity equivalent to the third gear ratio is transmitted from the input shaft 11 to the output shaft 12 through the first bypass clutch 51. Further, when an up-shift is performed in a high speed gear ratio group of the gear trains, a torque capacity equivalent to the sixth gear ratio is transmitted, thereby shift shocks being alleviated.

Further, describing down-shifts, at normal down-shifts or kick-downs in which the gear is down-shifted and an accelerator pedal is fully, abruptly depressed when passing, traveling conditions of a vehicle are detected by miscellaneous sensors and the first and second bypass clutches 51, 52 are engaged for a specified period of time according to predetermined programs. In some cases, if necessary, those bypass clutches or the start clutch 13 are released or the start clutch 13 is partially engaged (slip control state), thereby shocks at down-shifts are alleviated and at the same time a driver can enjoy a snappy ride due to shortened time for gearshiftings.

Next, jumping up-shifts and jumping down-shifts will be described. For example, when a driver makes an abrupt start with accelerator pedal relatively, deeply depressed and then he or she suddenly releases the accelerator pedal when the vehicle reaches a desired speed, sometimes the gear jumps from first gear to third gear according to a shift schedule determined by vehicle speeds and opening angles of the accelerator pedal. In such a case, shift shocks can be effectively reduced by the shift control as described before.

Further, in such harsh case as jumping up-shifts from first to fourth gear or from first to fifth gear, the normal shift control is available. In this case, a smooth shift operation can be achieved by selectively using two bypass clutches 51, 52 or controlling torque capacity in slightly lower level than required.

Further, in case of jumping down-shifts, when the accelerator pedal is fully depressed to overtake a preceding vehicle traveling at a relatively low speed while the own vehicle travels on a grade at medium speed in a highest speed ratio, the vehicle has a kick-down according to the shift schedule of the automatic transmission. Then, depending upon conditions of vehicle speeds and accelerator pedal angles, for example, such jumping down-shifts as from sixth to fourth gear, from sixth to third gear, or from sixth to second gear, can be performed. In such a case, it is possible to obtain the same smooth shift feeling as that in normal down-shifts.

Figure 5:
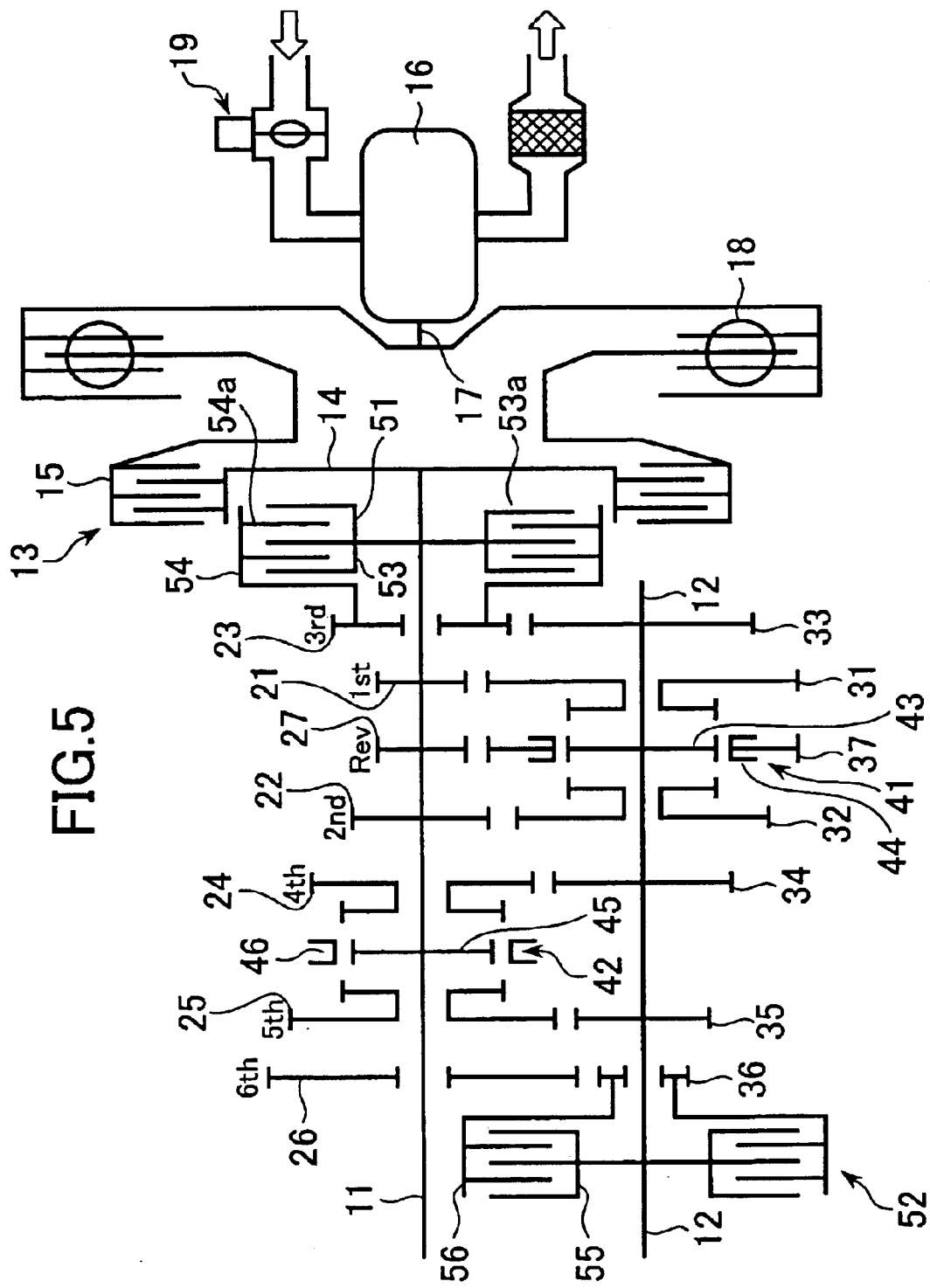
FIG. 5 is a skeleton diagram showing an automatic transmission according to a second embodiment of the present invention.

An automatic transmission shown in FIG. 5 is a second embodiment of the present invention. According to the automatic transmission, the first bypass clutch 51 is mounted on the input shaft 11 in the same manner as that of FIG. 1 but the second bypass clutch 52 is mounted on the output shaft 12. The clutch hub 55 of the second bypass clutch 52 is secured to the output shaft 12 and the clutch drum 56 is secured to the driven gear 36 of the sixth gear. The shift operation of the automatic transmission is performed in the same manner as in the automatic transmission shown in FIG. 1. In this embodiment, the first bypass clutch 51 may be mounted on the output shaft 12. In that case, the drive gear 23 is secured to the input shaft 11 and the driven gear 33 is rotatably mounted on the output shaft 12.

Figure 6:
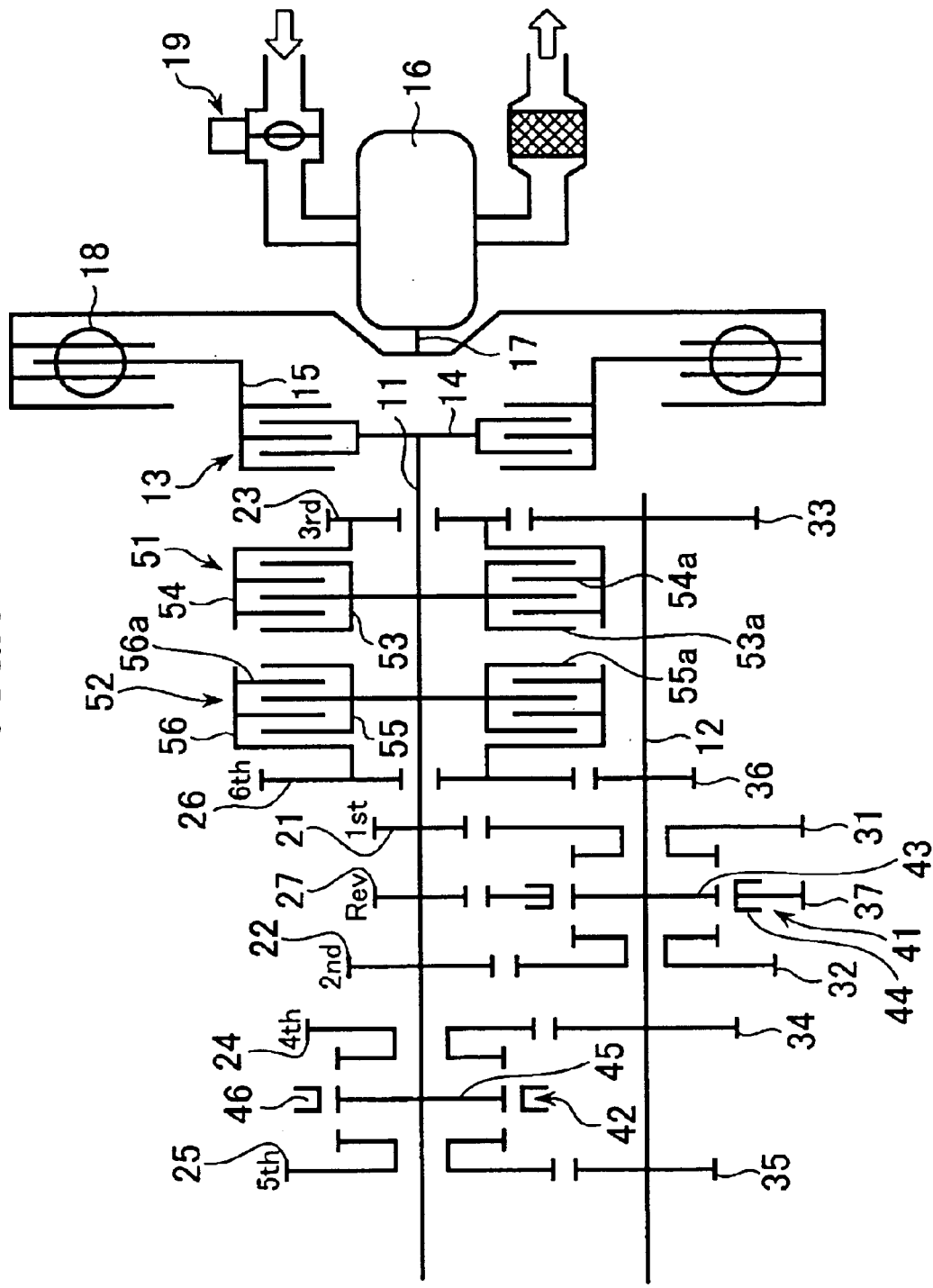
FIG. 6 is a skeleton diagram showing an automatic transmission according to a third embodiment of the present invention.

FIG. 6 is a skeleton diagram showing an automatic transmission according to a third embodiment of the present invention. In this automatic transmission, both bypass clutches 51, 52 are mounted on the input shaft 11 respectively. The sixth gear drive gear 26 is provided between the first gear drive gear 21 and the third gear drive gear 23 and both bypass clutches 51, 52 are integrally provided adjacently to each other between the third gear drive gear 23 and the sixth gear drive gear 26. The feature of this construction is to be able to integrate hydraulic circuits for controlling both bypass clutches 51, 52 and as a result the length of the hydraulic circuit can be shortened. Further, the responseability of respective bypass clutches 51, 52 can be enhanced. Further, the bypass clutches 51, 52 may be mounted adjacent to each other on the output shaft 12.

Figure 7:
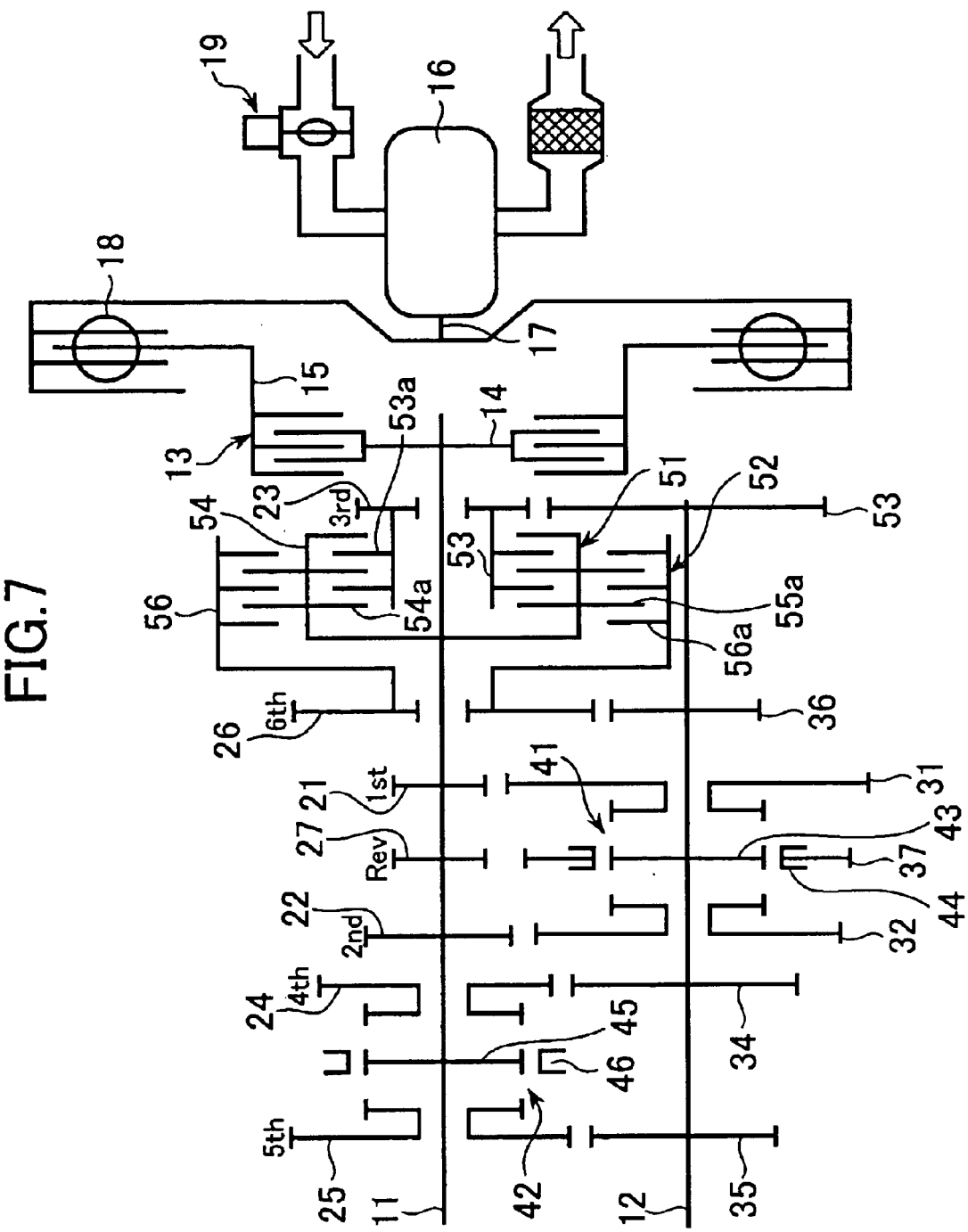
FIG. 7 is a skeleton diagram showing an automatic transmission according to a fourth embodiment of the present invention.
Figure 8:
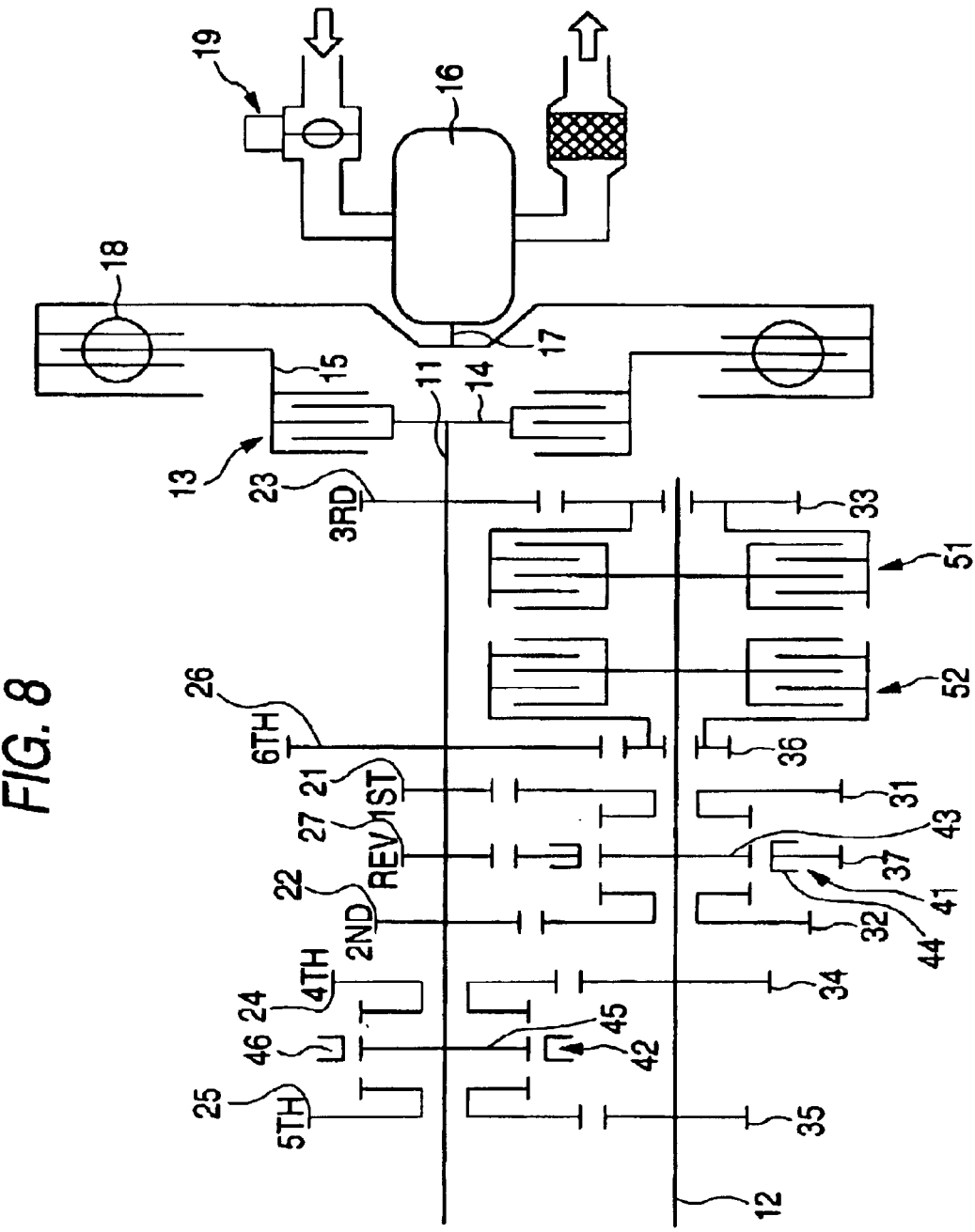
FIG. 8 is a skeleton diagram showing an automatic transmission according to a fifth embodiment of the present invention.

FIG. 7 is a skeleton diagram showing an automatic transmission according to a fourth embodiment of the present invention. In this automatic transmission, both bypass clutches 51, 52 are mounted on the input shaft 11 respectively but the second bypass clutch 52 is circumferentially provided around the outer periphery of the first bypass clutch 51. Therefore, the two bypass clutches 51, 52 are arranged on substantially the same radial plane. The clutch hub 53 of the first bypass clutch 51 is secured to the drive gear 23 and the clutch drum 54 is secured to the input shaft 11. Between these, the clutch discs 53a, 54a are interposed. On the other hand, as for the second bypass clutch 52, the clutch drum 54 of the first bypass clutch 51 works as a clutch hub of the second bypass clutch 52 and the clutch drum 56 outside of the clutch hub is secured to the sixth gear drive gear 26. The clutch discs 55a, 56a are interposed between both clutch drums 54, 56. In this case, since two bypass clutches are arranged in the radial direction, the axial length of the automatic transmission can be shortened.

Also in case of the automatic transmissions shown in FIG. 5 to FIG. 7, the bypass clutches 51, 52 are operated in the same manner as the automatic transmission shown in FIG. 1. The automatic transmissions according to the present invention can be mounted in any arrangements, longitudinally or transversely, in the engine room.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. An automatic transmission comprising:
   a plurality of gear trains provided between an input shaft and an output shaft, said gear trains each including a drive gear mounted on said input shaft and a driven gear mounted on said output shaft;
   a start clutch between a crankshaft of an engine and said input shaft;
   a changeover mechanism that selects a desired gear train through which power is transmitted;
   a plurality of bypass clutches to transmit torque directly from said input shaft to said output shaft using said plurality of gear trains; and
   a bypass clutch control means for engaging at least one of said plurality of bypass clutches, wherein said plurality of bypass clutches comprises:
      a first bypass clutch that engages a high gear ratio within a group of consecutive lower ratio gear trains; and
      a second bypass clutch that engages a high gear ratio within a group of consecutive higher ratio gear trains.

2. The automatic transmission of claim 1, wherein said bypass clutches are adjacently positioned on one of said input and output shafts.

3. The automatic transmission of claim 1, wherein said bypass clutches are adjacently positioned on said input shaft.

4. The automatic transmission of claim 1, wherein said plurality of bypass clutches are provided on one of said input and output shafts and one of said bypass clutches is circumferentially provided around an outer periphery of the other of said bypass clutches.

5. An automatic transmission comprising:
   a plurality of gear trains between an input shaft and an output shaft, said gear trains each including a drive gear mounted on said input shaft and a driven gear mounted on said output shaft;
   a start clutch between a crankshaft of an engine and said input shaft;
   a changeover mechanism that selects a desired gear train through which power is transmitted;
   a plurality of bypass clutches to transmit torque directly from said input shaft to said output shaft using said plurality of gear trains; and
   a bypass clutch control means for engaging at least one of said plurality of bypass clutches, wherein said plurality of bypass clutches comprises:
      a first bypass clutch that is operative when one of a group of consecutive lower ratio gear trains from said plurality of gear trains is selected; and
      a second bypass clutch that is operative when one of a group of consecutive higher ratio gear trains from said plurality of gear trains is selected.

6. The automatic transmission of claim 5, wherein said first bypass clutch has a gear ratio in the vicinity of the highest gear ratio of said consecutive lower ratio gear trains and said second bypass clutch has a gear ratio in the vicinity of the highest gear ratio of said consecutive higher ratio gear trains.

7. An automatic transmission comprising:
a plurality of gear trains provided between an input shaft and an output shaft, said gear trains each including a drive gear mounted on said input shaft and a driven gear mounted on said output shaft;
a start clutch provided between a crankshaft of an engine and said input shaft;
a changeover mechanism which selects a desired gear train through which power is transmitted;
a plurality of bypass clutches each being adapted to transmit torque from said input shaft to said output shaft; and
a bypass clutch control means for engaging at least one of said plurality of bypass clutches clutch, wherein said bypass clutches are adjacently positioned on said output shaft.

8. An automatic transmission comprising:
a plurality of gear trains between an input shaft and an output shaft, said gear trains each including a drive gear mounted on said input shaft and a driven gear mounted on said output shaft;
a start clutch between a crankshaft of an engine and said input shaft;
a changeover mechanism that selects a desired gear train through which power is transmitted;
a plurality of bypass clutches to transmit torque directly from said input shaft to said output shaft using said plurality of gear trains; and
a bypass clutch control means for engaging at least one of said plurality of bypass clutches, wherein one of said plurality of bypass clutches is provided on said input shaft and another of said plurality of bypass clutches provided on said output shaft.

9. An automated manual transmission comprising:
an input shaft;
an output shaft directly engageable to said input shaft via a plurality of gear trains; and
a plurality of bypass clutches each for directly engaging said input shaft to said output shaft using one of said plurality of gear trains, wherein said plurality of bypass clutches comprises:
a first bypass clutch that engages a high gear ratio within a group of consecutive lower ratio gear trains; and
a second bypass clutch that engages a high gear ratio within a group of consecutive higher ratio gear trains.

10. The transmission of claim 9, further comprising:
a changeover mechanism that selectively engages one of said plurality of gear trains; and
a bypass clutch controller that selectively engages one of said plurality of bypass clutches in response to said changeover mechanism disengaging from another one of said plurality of gear trains.

11. The transmission of claim 9, further comprising a start clutch provided on said input shaft for transferring power from an engine crankshaft to said input shaft.

12. The transmission of claim 9, wherein one of said plurality of bypass clutches is provided on one of said input shaft and said output shaft.

13. The transmission of claim 12, wherein another of said plurality of bypass clutches is provided on said one of said input shaft and said output shaft.

14. The transmission of claim 13, wherein said one of said plurality of bypass clutches is positioned adjacent to said another of said plurality of bypass clutches.

15. The transmission of claim 13, wherein said one of said plurality of bypass clutches is positioned circumferentially around the outer periphery of said another of said plurality of bypass clutches.

16. An automated manual transmission comprising:
an input shaft;
an output shaft directly engageable to said input shaft via a plurality of gear trains; and
a plurality of bypass clutches each for directly engaging said input shaft to said output shaft using one of said plurality of gear trains,
wherein one of said plurality of bypass clutches is provided on one of said input shaft and said output shaft, and
wherein another of said plurality of bypass clutches is provided on the other one of said input shaft and said output shaft.

17. An automated manual transmission comprising:
an input shaft;
an output shaft directly engageable to said input shaft via a plurality of gear trains; and
a plurality of bypass clutches each for directly engaging said input shaft to said output shaft using one of said plurality of gear trains, wherein one of said plurality of bypass clutches engages one of a plurality of consecutive lower ratio gear trains and another of said plurality of bypass clutches engages one of a plurality of consecutive a higher ratio gear trains.

18. The transmission of claim 17, wherein said one of said plurality of bypass clutches engages the highest ratio gear train of said consecutive lower ratio gear trains and said another of said plurality of bypass clutches engages the highest ratio gear train of said consecutive higher ratio gear trains.

19. An automatic transmission comprising:
an input shaft including a plurality of drive gears;
an output shaft including a plurality of driven gears and disposed in parallel with the input shaft, the driven gears engaging with the drive gears;
a start clutch provided between a crankshaft of an engine and the input shaft for transmitting or shutting off an engine power to the input shaft;
a changeover mechanism for selecting a desired gear train through which power is transmitted from a plurality of the gear trains, the plurality of gear trains including the drive gears and the driven gears;
a first bypass clutch that transmits a torque of the input shaft to the output shaft and that engages a high gear ratio within a group of consecutive lower ratio gear trains;
a second bypass clutch that transmits the torque of the input shaft to the output shaft by a different torque from the first bypass clutch and that engages a high rear ratio within a group of consecutive higher ratio gear trains;
a bypass clutch control unit controlling the power transmitting from the input shaft to the output shaft through at least one of the bypass clutches when the gear is shifted,
wherein the first bypass clutch is operative when the gear trains of the group of consecutive lower ratio gear trains are selected on gearshifting, the second bypass clutch is operative when the gear trains of the group of the consecutive higher ratio gear trains are selected on gearshifting.

20. The automatic transmission according to claim 19, wherein a gear ratio of the first bypass clutch comprises the highest gear ratio of the group of consecutive lower ratio gear trains and a gear ratio of the second bypass clutch comprises the highest gear ratio of the group of consecutive higher ratio gear trains.

21. The automatic transmission according to claim 19, wherein both of the first bypass clutch and the second bypass clutch are provided on one of the input shaft and the output shaft.

22. The automatic transmission according to claim 19, wherein the two bypass clutches are provided on one of the input shaft and output shaft, one of the two bypass clutched is disposed on an outside of the other bypass clutch in a radial direction.

23. The automatic transmission according to claim 19, wherein the torque is transmitted from the input shaft to the output shaft through the bypass clutches when the gear is shifted, then the changeover mechanism disengages the bypass clutch after the rotation of the input shaft and the output shaft are synchronized with that of the changed gear trains.

24. The automatic transmission according to claim 19, wherein the first bypass clutch is provided on one of the input shaft and the output shaft and the second bypass clutch is provided on the other one of the input shaft and the output shaft.

* * * * *